J. B. DAVIS.
LIQUID DISPENSING APPARATUS.
APPLICATION FILED AUG. 4, 1919.
1,341,263.
Patented May 25, 1920.
3 SHEETS—SHEET 1.
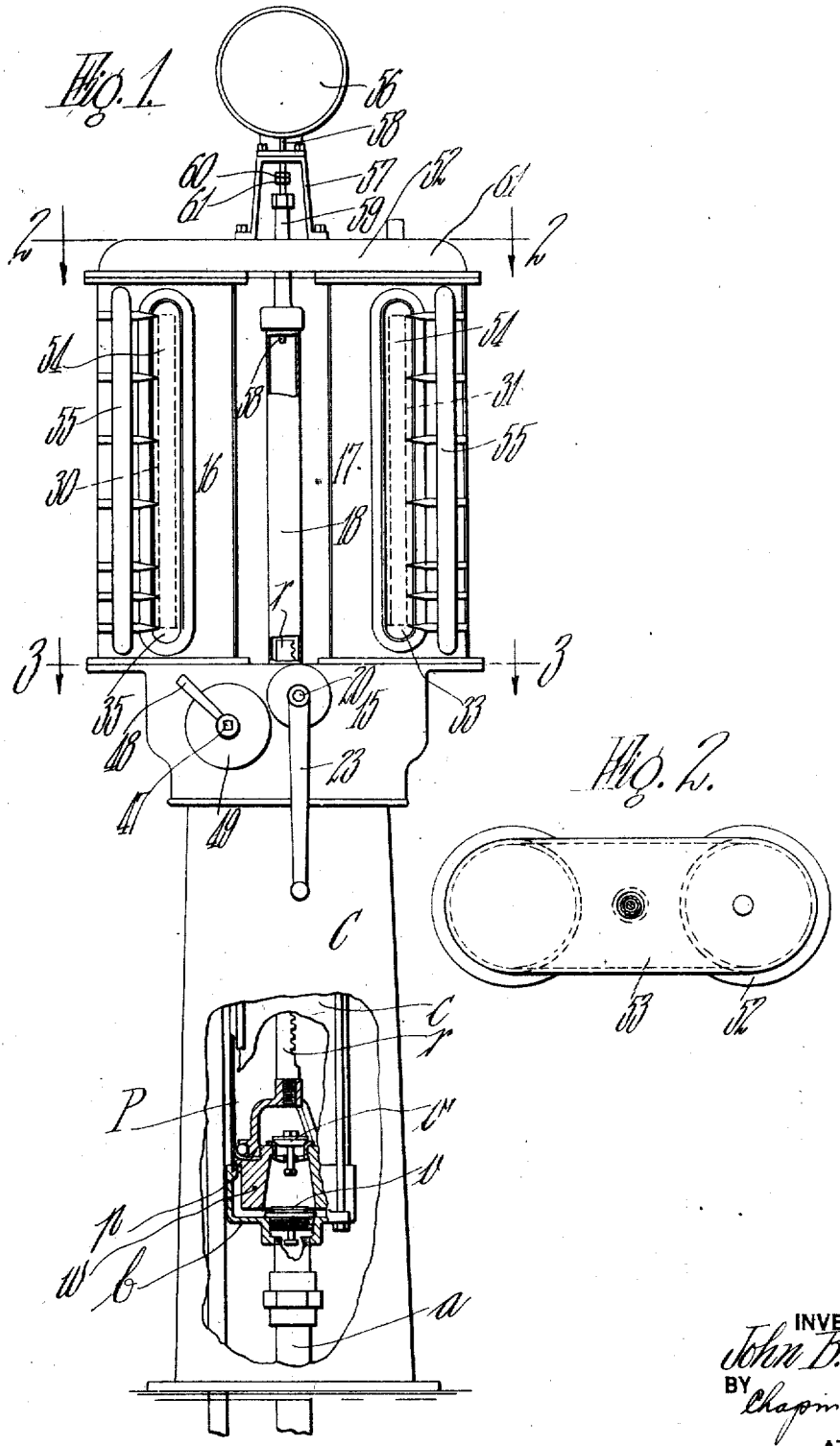
INVENTOR
John B. Davis.
BY
Chapin + Neal
ATTORNEYS.

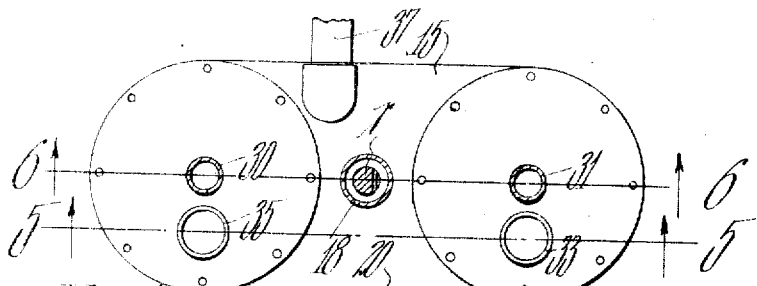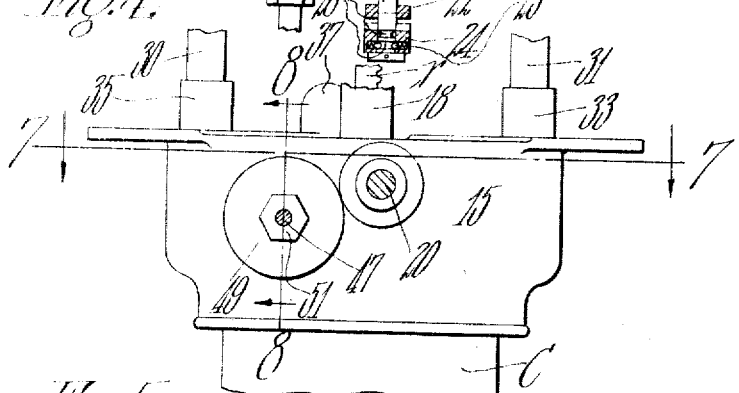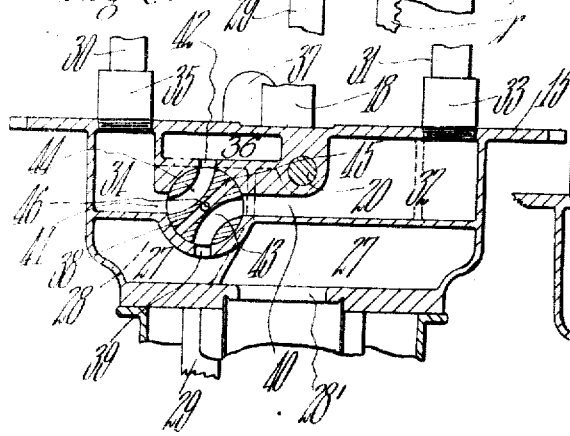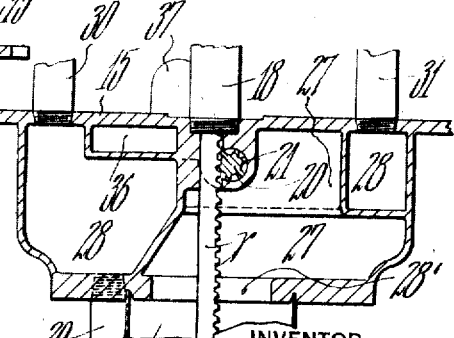

J. B. DAVIS.
LIQUID DISPENSING APPARATUS.
APPLICATION FILED AUG. 4, 1919.
1,341,263.
Patented May 25, 1920.
3 SHEETS—SHEET 3.
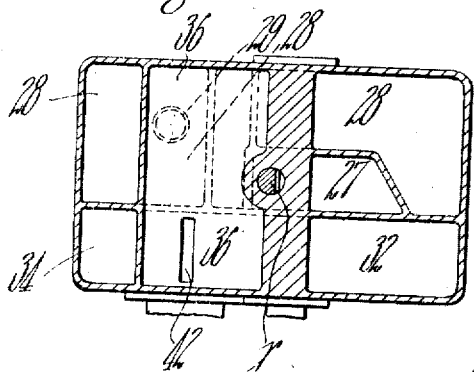
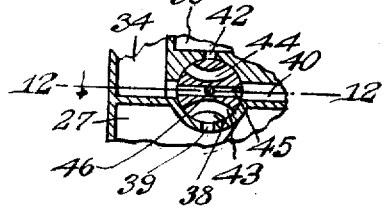
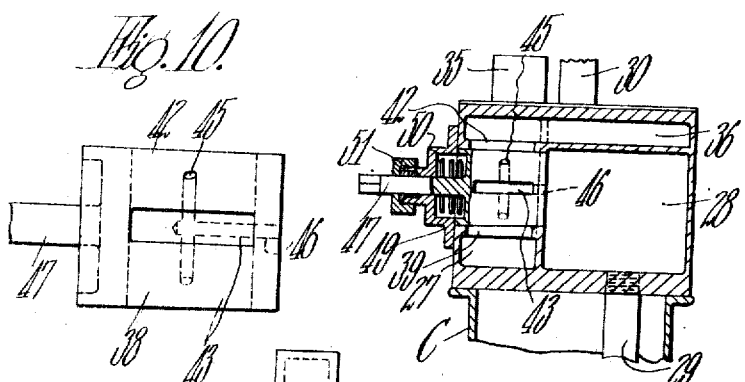
INVENTOR
John B. Davis.
BY
Chapin & Neal.
ATTORNEYS.

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETT.

LIQUID-DISPENSING APPARATUS.

1,341,263.

Specification of Letters Patent. Patented May 25, 1920.

Application filed August 4, 1919. Serial No. 315,209.

*To all whom it may concern:*

Be it known that I, JOHN B. DAVIS, a citizen of the United States of America, residing at Springfield, in the county of Hampden and State of Massachusetts, have invented certain new and useful Improvements in Liquid-Dispensing Apparatus, of which the following is a specification.

This invention relates to improvements in liquid dispensing apparatus, and more particularly, to dispensing apparatus of the visible measuring type.

An object of the invention is to provide a pump and two visible measuring cylinders, together with means to alternately connect the cylinders to the pump and at the same time to connect that cylinder, not connected to the pump, to the discharge pipe.

Another object of the invention is to provide a passage connecting the upper parts of the measuring cylinders, so that the liquid, pumped into one, will force air into the other to aid in the discharge of liquid therefrom.

Another object of the invention is to provide a pump, a chambered member thereon into which the pump discharges, and two visible measuring cylinders supported by and communicating with the chambered member, together with a valve in the latter to connect first one and then the other cylinder to the pump and at the same time connect that cylinder, not connected to the pump, to the discharge pipe, the valve being arranged to simultaneously connect both cylinders to a drain chamber, when desired.

A further object of the invention is to provide in a liquid dispensing apparatus, generally improved mechanical structure.

Other objects and advantages will appear in the following description and in the illustrative embodiment of the invention in the accompanying drawings, in which—

Figure 1 is a front elevational view of a liquid dispensing apparatus embodying the invention;

Figs. 2 and 3 are sectional plan views thereof taken on the lines 2—2 and 3—3 respectively of Fig. 1;

Fig. 4 is an enlarged fragmentary front elevational view of the chambered member interposed between the pump and the measuring cylinders;

Figs. 5 and 6 are sectional elevational views thereof taken on the lines 5—5 and 6—6 respectively of Fig. 4;

Fig. 7 is a sectional plan view taken on the line 7—7 of Fig. 4;

Fig. 8 is a cross sectional view taken on the line 8—8 of Fig. 4;

Fig. 9 is a detail view of the valve which controls the communication between the pump cylinder and the measuring cylinders, and the communication between the latter and the discharge pipe and the drain pipe as well;

Fig. 10 is an enlarged fragmentary sectional elevation of one of the measuring cylinders;

Fig. 11 is a fragmentary sectional view showing the valve in draining position; and Fig. 12 is a sectional plan view taken on the line 12—12 of Fig. 11.

Referring to these drawings in detail; the dispensing apparatus, in general, comprises a suitable pump, preferably housed within a casing or pedestal; a chambered member which forms a cap for the pump cylinder, as well as for the casing or pedestal if such are used; a pair of visible measuring cylinders mounted on and connected with the chambered member; a cap member for both measuring cylinders which preferably provides means for intercommunication between such cylinders; operating mechanism for the pump; a controlling valve to alternately connect the measuring cylinders to the pump and to connect one measuring cylinder to the discharge pipe when the other is connected to the pump, as well as to simultaneously connect both with the drain; indicating means for the measuring cylinders; and, if desired, a discharge register to totalize the amounts discharged.

The pump, indicated generally by reference letter P, may be of any suitable type. As shown, it is of the single acting reciprocating piston type and includes a cylinder *c*; a piston *p*, preferably weighted, as at *w*, to permit rapid descent by gravity; and a piston rod *r* in the form of a rack. The entire pump P is housed within a suitable hollow pedestal or casing *C*, and, through the base of the latter, an inlet pipe *a* enters and is connected to the base *b* of the pump. A valve *v* is associated with inlet pipe *a* and is adapted to be lifted by the suction created by an upstroke of piston $p$ and to close by pressure or gravity. The piston $p$ is also provided with a valve $v'$, which remains closed on the upstroke of the piston, while valve $v$ is open, and opens on the downstroke of the piston, which valve $v$ is closed, to permit the passage of the fluid through the piston, to be subsequently lifted by the piston and discharged into one or the other of the measuring cylinders.

The top of the cylinder $c$, and preferably as shown the top of the pedestal C, are capped by a chambered member 15. Such member may conveniently be made in the form of a cored casting, having a plurality of chambers and passageways, as will appear, and a plane top face upon which two measuring cylinders 16 and 17 are secured in spaced relation, one on each side of the vertical axis of the pump P. The member 15 is bored out vertically to receive the toothed piston rod $r$ (Fig. 6), which extends upwardly and centrally between the cylinders 16 and 17 through a pipe 18 (Fig. 1). The member 15 is likewise bored out horizontally to receive a shaft 20 (Fig. 5) which as shown in Fig. 6 is milled near its central portion to provide a pinion 21 to mesh with rack $r$. The shaft 20 extends outside member 15 (Fig. 3) and has fixed thereon a clutch element 22 and carries loosely a handle 23 which has a clutch element 24 to engage with element 22. A spring pressed ball 25 is provided in handle 23 to engage in either of two circumferential grooves 26 in shaft 20 and thereby releasably hold the handle in either of its two positions,—viz. so that elements 22 and 24 are engaged or disengaged. By pushing handle 23 axially inward to engage such elements, the shaft 20 may be rotated and the rack bar piston rod $r$ lifted, and by thereafter pulling handle 23 axially outward the elements 22 and 24 are disengaged and the piston $p$ is allowed to drop by gravity.

The member 15 is provided near its lower portion with a fluid inlet chamber 27, which, as shown in Figs. 5 and 6, constantly communicates with the open upper end of the pump-cylinder $c$ by way of an opening 28' in the lower wall of the member. This chamber 27 occupies all of the space in the lower half of member 15 except for one corner which, as shown in Fig. 6, forms part of a drain chamber 28,—specifically a sump to which is connected a drain pipe 29 leading downwardly through pedestal C and adapted for connection to the supply tank. The drain chamber 28 is of peculiar shape. From the pocket or sump, connected with pipe 29, it extends upwardly completely to the upper wall of member 15 for connection to a pipe 30, threaded therein and hereinafter called an overflow pipe. The chamber 28 also extends along the rear half of member 15, but below the upper wall thereof and dips down in under the shaft 20, after which it rises and is again bounded by the upper wall of member 15 as will be seen from Figs. 6 and 7. The right hand end (Figs. 6 and 7) of chamber 28 is connected to a second overflow pipe 31. That portion of the right hand end of member 15 above the inlet chamber 27 and forwardly from chamber 28 constitutes a chamber 32 which is connected by a short pipe 33 with the measuring cylinder 17. That portion of the left hand end of member 15 above the inlet chamber 27 and forwardly of the drain chamber 28 constitutes a chamber 34 which is connected by a short pipe 35 with the interior of measuring cylinder 16. Extending from front to rear of member 15 and along the extreme upper portion thereof is a discharge chamber 36, which is connected to a discharge pipe 37 (Figs. 3, 5, and 6), the highest point of which is at least no higher than the tops of pipes 33 and 35.

That portion of member 15 forwardly of the drain chamber 28 and between the chambers 27, 32, 34, and 36 is bored out in frusto-conical form to receive a correspondingly formed plug valve 38. Ports 39, 40, 41, and 42 connect the chambers 27, 32, 34, and 36 to such frusto-conical bore. Such ports are arranged in right angular relation and the valve 38 is provided with curved passages 43 and 44, each of which is adapted to connect any one port to a port at right angles to it. Thus, valve 38 may be so positioned that chambers 27 and 32 are placed in communication by means of passage 43, while passage 44 serves to place chamber 34 in communication with chamber 36. A movement of valve 38 ninety degrees from the illustrated position, will cause chambers 27 and 34 to communicate through passage 43 while chambers 32 and 36 are connected by way of passage 44. Thus, fluid may be pumped into one measuring cylinder while the other measuring cylinder is connected to discharge through pipe 37. The valve 38 has a diametrical passage 45, disposed between the passages 43 and 44, and this passage 45 is adapted to connect the chambers 32 and 34 so that both measuring cylinders communicate. The inner end face of valve 38, as shown in Fig. 8, forms part of one wall of the drain chamber 28 and, thus, an axial passage 46, which leads from the passage 45 to and through the inner end face of valve 38, serves when desired to connect the measuring cylinders 32 and 34 to the drain chamber 28.

The valve 38 is provided with a stem 47, (Fig. 8), the outer end of which is squared, as indicated, to receive an operating handle 48. Over this stem is placed a flange 49, which is suitably secured to member 15. A spring 50, coiled about stem 47, acts between flange 49 and the inner end face of valve 38 with a constant tendency to force valve 38 axially inward so that the valve is held tightly in its tapered bore at all times. A stuffing box 49 is provided to insure against leakage around stem 47.

The measuring cylinders 16 and 17 are secured to the top face of member 15 with their overflow pipes 30 and 31, respectively, disposed centrally therein. These cylinders are open at both ends, their lower ends being closed by member 15, except for the pipes 30, 31, 33, and 35 described, while their upper ends are connected by a top header member 52 through which the cylinders 16 and 17 at all times communicate. At least one window 54 is provided in each of the cylinders 16 and 17 and adjacent each window is an indicating scale, represented conventionally at 55.

If desired, a discharge register may be provided as indicated conventionally at 56, such register being supported by means of a bracket 57 from the top of header member 52. A reciprocable register actuating rod is shown at 58, such rod being slidable in bracket 57 and depending through an extension 59 of pipe 18 into the latter and into such position as to be engaged by the upper end of rack r at the end of each stroke. Thus, each upstroke of rack r can readily be made to operate a register, such as 56, so that the total quantities discharged from the pump may be indicated thereon. The rod 58 is provided with a nut 60, which is adapted to abut the bracket 57 and limit the stroke of the pump in an obvious manner, and the nut, being threaded on rod 58, may be adjusted thereon as desired to vary such stroke, a check nut 61 being provided to hold nut 60 in adjusted position.

Referring now to Fig. 9; there is provided on the top of the overflow pipe 31, an adjustable end section 62, which in this instance is threaded on pipe 31 and held in adjusted position by a check nut 63. An annular float 64 encompasses the section 62 and secured thereto is a valve plate 65 by means of which the upper end of section 62 may be closed. Guides 66 depend from plate 65 into section 62 and prevent the valve plate 65 and float 64 from lateral displacement when they are lifted by the rise of fluid in cylinder 17, as will appear. It is to be understood that a duplicate arrangement is provided in connection with the overflow pipe 30 of cylinder 16.

Means are also provided to insure an air vent at times when it is desired to drain the measuring cylinders 16 and 17, both valve 65 and the corresponding valve associated with overflow pipe 30 being presumably closed at such times. The vent device consists of a casing 70 threaded into member 52 and closed except for an inlet 71 for air and an outlet pipe 72 extending into passage 53. A valve 73, when lifted, permits communication between pipe 72 and passage 53, but is arranged to be lifted by the pressure of the air in casing 70. Consequently, during normal operation, when the pressure in passage 53 equals or exceeds atmospheric pressure, valve 73 remains closed.

In operation, the operator turns handle 48 to bring valve 38 into such position that one of the chambers 32 and 34 is connected to the inlet chamber 27, the other of the chambers 32 and 34 being thereby connected to the discharged chamber 36. The handle 23, having previously been moved to engage the clutch members 22 and 24, is then turned in the usual manner to lift piston p. The fluid is thus forced upwardly into and through the inlet chamber 27 and into one of the measuring cylinder chambers, as 32, and thence out through pipe 33 into the measuring cylinder 17. Assuming that the measuring cylinder 16 has previously been filled with fluid, it is, as has been seen, connected to discharge through pipe 35 into chamber 34 and thence by way of passage 41 to the discharge chamber 36. Therefore, since the valve 65 is closed to prevent outflow through pipe 31 and since the corresponding valve associated with overflow pipe 30 is also closed for a like purpose, the fluid as it rises in cylinder 17 forces the air upwardly through passage 53 and downwardly into measuring cylinder 16. Thus, such air forces the fluid previously pumped into cylinder 16 outwardly. This arrangement, whereby the pumping of fluid into one cylinder forces fluid previously pumped into the other cylinder outwardly, constitutes one of the important features of my invention.

As the fluid rises in cylinder 17, it eventually lifts float 64 and raises valve 65. The stroke of piston p is so gaged, by adjustment of nut 60, as to supply fluid into the measuring cylinders somewhat above the level of the overflow pipe, or more particularly, above the top of the adjustable section 62 thereon. When rack r is arrested by abutment of nut 60 with bracket 57, the operator ceases to turn handle 23. Meanwhile, the excess fluid above the top of pipe 62 enters therein and the valve 65 again closes, leaving an accurately measured quantity of fluid in cylinder 17. The operator then turns handle 48 to connect cylinder 17 to the discharge chamber 26, thereby connecting cylinder 16 to the inlet chamber 27. The handle 23 may then be moved to disconnect clutch elements 22 and 24, whereupon the piston p descends by gravity. Then the operator again connects handle 23 to lift piston p and repeats the operations described, whereupon the air entering cylinder 17 forces the fluid outwardly until it reaches the level of the top of pipe 33.

Whenever it is desired to drain the cylinders 16 and 17, the operator turns handle 48 to connect the chambers 32 and 34 to the drain chamber 28 and the valve 73 opens to permit the entrance of air to displace the liquid. Of course, the valve 73 will also open when either cylinder 16 or 17 is connected to the discharge chamber and will permit such cylinder to drain by gravity. In practice, however, the operator pumps liquid into one cylinder very shortly after the other has been connected to the discharge chamber and before the last-named cylinder has a chance to drain by reason of the small air vent afforded by valve 73. As soon as pumping is commenced, pressure, greater than atmospheric, will be established in passage 53, and valve 73 will close, whereupon the pressure of the incoming fluid will be transmitted by the air in cylinders 16 and 17 and passage 53, to the outflowing fluid to aid in discharging the latter. By this arrangement, a more speedy discharge of fluid will be obtained than would be by the vent valve 73 alone.

According to some features of the invention, the valves associated with the overflow pipes 30 and 31 may be omitted and even the connecting passage 53, for the remaining structural arrangement has utility apart from the features noted although such features are desirable and preferred.

The invention has been disclosed herein, in the embodiment at present preferred, for illustrative purposes, but the scope of the invention is defined by the appended claims rather than by the foregoing description.

What I claim is—

1. A liquid dispensing apparatus, comprising, a pump, two measuring cylinders, a member interposed between the pump and cylinders, chambers in said member one for each cylinder and constantly communicating therewith, a pump chamber in said member to receive the discharge from said pump, a delivery chamber in said member, and means to connect either one of said cylinder chambers to the pump chamber and the other to the delivery chamber.

2. A liquid dispensing apparatus, comprising, a pump, two measuring cylinders, a member interposed between the pump and cylinders, chambers in said member one for each cylinder and constantly communicating therewith, a pump chamber in said member to receive the discharge from said pump, a delivery chamber in said member, a drain chamber in said member, and means to connect either one of said cylinder chambers to the pump chamber and the other to the delivery chamber, or to simultaneously connect both cylinder chambers to the drain chamber.

3. A liquid dispensing apparatus, comprising, a pump, a member thereon having a chamber into which said pump discharges, two measuring cylinders on said member, chambers in said member one for each measuring cylinder and communicating therewith near the base thereof, a discharge chamber in said member, a valve movable to positions to connect either one of the cylinder chambers to the first-named chamber and the other one of said cylinder chambers to the discharge chamber, a drain chamber provided in said member, and an overflow pipe for each cylinder and communicating therewith near the top thereof, both said pipes communicating with the drain chamber.

4. A liquid dispensing apparatus, comprising, a pump, a member thereon having a chamber into which said pump discharges, two measuring cylinders on said member, chambers in said member one for each measuring cylinder and communicating therewith near the base thereof, a discharge chamber in said member, a valve movable to positions to connect either one of the cylinder chambers to the first-named chamber and the other one of said cylinder chambers to the discharge chamber, a drain chamber provided in said member, and an overflow pipe for each cylinder and communicating therewith near the top thereof, both said pipes communicating with the drain chamber, said valve being movable to another position to connect both cylinder chambers to said drain chamber.

5. In a liquid dispensing apparatus, a reciprocating piston pump, a chambered member capping the cylinder of said pump to receive the discharge therefrom, two measuring cylinders supported on said member and communicating with the interior thereof, a discharge passage in said member, means in said member to first connect one measuring cylinder to the pump cylinder and the other to the discharge passage and to subsequently connect the first measuring cylinder to the discharge passage and the second to the pump cylinder, a casing extending from said member and disposed between said measuring cylinders, a piston rod for the pump movable through said member and into said casing, and rotary means in said member to reciprocate the piston rod.

6. In a liquid dispensing apparatus, a reciprocating piston pump, a chambered member capping the cylinder of said pump to receive the discharge therefrom, two measuring cylinders supported on said member and communicating with the interior thereof, a discharge passage in said member, means in said member to first connect one measuring cylinder to the pump cylinder and the other to the discharge passage and to subsequently connect the first measuring cylinder to the discharge passage and the second to the pump cylinder, a casing extending from said member and disposed between said measuring cylinders, a piston rod for the pump movable through said member and into said casing, rotary means in said member to reciprocate the piston rod, a member in the upper end of said casing disposed in the path of the piston rod and adapted to be engaged and moved thereby, and means restricting the movement of said member to limit the movement of the piston rod.

7. In a liquid dispensing apparatus, a reciprocating piston pump, a chambered member capping the cylinder of said pump to receive the discharge therefrom, two measuring cylinders supported on said member and communicating with the interior thereof, a discharge passage in said member, means in said member to first connect one measuring cylinder to the pump cylinder and the other to the discharge passage, and to subsequently connect the first measuring cylinder to the discharge passage and the second to the pump cylinder, a casing extending from said member and disposed between said measuring cylinders, a piston rod for the pump movable through said member and into said casing, rotary means in said member to reciprocate the piston rod, and means in the upper end of said casing to arrest the piston rod and limit its upward travel.

8. In a liquid dispensing apparatus, a reciprocating piston pump, a pedestal incasing the latter, a chambered member capping both cylinder and pedestal and receiving the discharge from the cylinder, two measuring cylinders supported on said member and communicating with the interior thereof, a discharge passage in said member, means in said member to first connect one measuring cylinder to the pump cylinder and the other to the discharge passage and to subsequently connect the first measuring cylinder to the discharge passage and the second to the pump cylinder, a casing extending from said member and disposed between said measuring cylinders, a piston rod for the pump movable through said member and into said casing, and rotary means in said member to reciprocate the piston rod.

9. In a liquid dispensing apparatus, a reciprocating piston pump, a chambered member capping the cylinder of said pump to receive the discharge therefrom, two measuring cylinders supported on said member and communicating with the interior thereof, a discharge passage in said member, means in said-member to first connect one measuring cylinder to the pump cylinder and the other to the discharge passage and to subsequently connect the first measuring cylinder to the discharge passage and the second to the pump cylinder, a piston rod for the pump movable through said member, and rotary means in said member to reciprocate the piston rod.

10. A liquid dispensing apparatus, comprising, a pump, a member thereon into which the pump discharges, two measuring cylinders supported on said member and communicating therewith near their lower ends, a common cap member for both cylinders and having a passage to afford constant communication between said cylinders, a discharge passage provided in said member, and means associated with the latter to connect the pump to one cylinder and the discharge passage to the other cylinder and to later connect the pump to the other cylinder and the discharge passage to the first named cylinder.

JOHN B. DAVIS.